(12) United States Patent
Jeong et al.

(10) Patent No.: US 12,163,710 B2
(45) Date of Patent: Dec. 10, 2024

(54) REFRIGERATOR AND METHOD OF CONTROLLING THE SAME

(71) Applicant: Samsung Electronics Co., Ltd., Suwon-si (KR)

(72) Inventors: Jin Jeong, Suwon-si (KR); Yonghan Kim, Suwon-si (KR); Bongsu Son, Suwon-si (KR); Kwanyeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 17/236,939

(22) Filed: Apr. 21, 2021

(65) Prior Publication Data

US 2021/0325096 A1 Oct. 21, 2021

(30) Foreign Application Priority Data

Apr. 21, 2020 (KR) .................. 10-2020-0048344

(51) Int. Cl.
*F25B 41/20* (2021.01)
*F25B 39/00* (2006.01)
*F25B 49/02* (2006.01)

(52) U.S. Cl.
CPC ............ *F25B 49/022* (2013.01); *F25B 39/00* (2013.01); *F25B 41/20* (2021.01);
(Continued)

(58) Field of Classification Search
CPC ........ F25B 49/022; F25B 41/20; F25B 39/00; F25B 2600/0253; F25B 2600/2501;
(Continued)

(56) References Cited

U.S. PATENT DOCUMENTS 5,127,236 A 7/1992 von Blanquet
11,029,072 B2 * 6/2021 Hirai ....................... F25B 41/20
(Continued)

FOREIGN PATENT DOCUMENTS

JP  H-05126446 A    5/1993
JP  2018105522 A *  7/2018
(Continued)

OTHER PUBLICATIONS

WO-2010073652-A1 English Translation (Year: 2010).*
(Continued)

*Primary Examiner* — David J Teitelbaum
*Assistant Examiner* — Devon Moore

(57) ABSTRACT

A refrigerator includes a compressor, a condenser, an evaporator, switching valve, an ice-making device, a controller, and a first refrigerant pipe and a second refrigerant pipe connected between the condenser and the evaporator. The switching valve is configured to guide the refrigerant condensed in the condenser to the first refrigerant pipe or the second refrigerant pipe. The ice-making device allows the first refrigerant pipe to pass therethrough and is configured to cool water stored in an ice-making tray. The controller is configured to control the switching valve to guide the refrigerant to the ice-making device through the first refrigerant pipe. In response to a temperature of the ice-making tray falling to a level lower than or equal to a reference temperature, the controller is configured to control the switching valve to prevent the refrigerant from being guided to the first refrigerant pipe and supply water to the ice-making tray.

14 Claims, 12 Drawing Sheets

(52) U.S. Cl.
CPC .............. *F25B 2600/0253* (2013.01); *F25B 2600/2501* (2013.01); *F25B 2700/2104* (2013.01)

(58) Field of Classification Search
CPC .......... F25B 2600/04; F25B 2700/2104; F25B 2700/12; F25C 1/00; F25C 1/04; F25C 1/10
See application file for complete search history.

(56) References Cited

U.S. PATENT DOCUMENTS

| | | | | |
|---|---|---|---|---|
| 2013/0167575 | A1* | 7/2013 | Hong | F25C 1/00 |
| 2016/0370088 | A1* | 12/2016 | Koo | F25C 5/182 |
| 2018/0216862 | A1 | 8/2018 | Junge et al. | |
| 2018/0252456 | A1* | 9/2018 | Miyakoshi | F25B 5/00 |
| 2020/0033040 | A1* | 1/2020 | Bertolini | F25C 5/187 |

FOREIGN PATENT DOCUMENTS

| | | | |
|---|---|---|---|
| KR | 10-2006-0007510 A | 1/2006 | |
| KR | 10-2010-0082617 A | 7/2010 | |
| KR | 10-2011-0056025 A | 5/2011 | |
| KR | 10-2013-0020063 A | 2/2013 | |
| KR | 10-2013-0077528 A | 7/2013 | |
| KR | 10-2015-0044308 A | 4/2015 | |
| KR | 10-1705666 B1 | 2/2017 | |
| KR | 10-2018-0090691 A | 8/2018 | |
| KR | 10-2021-0005477 A | 1/2021 | |
| WO | WO-2010073652 A1 * | 7/2010 | ............. F25D 29/00 |
| WO | WO-2013084439 A1 * | 6/2013 | .......... F04B 39/0027 |
| WO | WO-2020071751 A1 * | 4/2020 | ................. F25C 1/18 |
| WO | WO-2020071772 A1 * | 4/2020 | ................. F25C 1/18 |
| WO | WO-2020071790 A1 * | 4/2020 | ................. F25C 1/10 |
| WO | WO-2020130473 A1 * | 6/2020 | ............. F25B 47/022 |

OTHER PUBLICATIONS

KR-20130077528-A English Translation (Year: 2013).*
WO-2013084439-A1 English Translation (Year: 2013).*
JP-2018105522-A English Translation (Year: 2018).*
WO-2020071790-A1 English Translation (Year: 2020).*
WO-2020071772-A1 English Translation (Year: 2020).*
WO-2020071751-A1 English Translation (Year: 2020).*
WO-2020130473-A1 English Translation (Year: 2020).*
International Search Report of the International Searching Authority in connection with International Application No. PCT/KR2021/004410 issued Jul. 16, 2021, 3 pages.

* cited by examiner

REFRIGERATOR AND METHOD OF CONTROLLING THE SAME

CROSS-REFERENCE TO RELATED APPLICATION

This application is based on and claims priority under 35 U.S.C. § 119 to Korean Patent Application No. 10-2020-0048344 filed on Apr. 21, 2020 in the Korean Intellectual Property Office, the disclosure of which is incorporated by reference herein in its entirety.

BACKGROUND

1. Field

The disclosure relates to a refrigerator, and more specifically, to a refrigerator including an ice-making device capable of manufacturing ice, and a method of controlling the same.

2. Description of the Related Art

In general, a refrigerator refers to an apparatus that is equipped with a storage chamber and a cold air supply device for supplying cold air to the storage chamber, and keeps food in a fresh state. The refrigerator may be further equipped with an ice-making device for manufacturing ice.

As a method of freezing water, a direct cooling method is configured in a way to cool water by a refrigerant pipe that extends into an ice-making chamber and makes contact with an ice-making tray. In the direct cooling method, the ice-making tray may receive cooling energy from the refrigerant pipe in a heat conduction method.

In this case, since the ice-making device is connected in a direct cooling method and receives a refrigerant together with an evaporator of the storage chamber, water in the ice-making tray is rapidly cooled while the refrigerant is flowing, so that the transparency and density of ice are lowered.

SUMMARY

Therefore, it is an object of the disclosure to provide a refrigerator including an ice-making device capable of producing ice having a high transparency and density.

Additional aspects of the disclosure will be set forth in part in the description which follows and, in part, will be obvious from the description, or may be learned by practice of the disclosure.

According to an aspect of the disclosure, there is provided a refrigerator including: a compressor configured to compress a refrigerant; a condenser configured to condense the compressed refrigerant; an evaporator configured to evaporate the condensed refrigerant; a first refrigerant pipe and a second refrigerant pipe connected between the condenser and the evaporator; a switching valve configured to guide the refrigerant condensed in the condenser to the first refrigerant pipe or the second refrigerant pipe; an ice-making device allowing the first refrigerant pipe to pass therethrough and configured to cool water stored in an ice-making tray; and a controller configured to control the switching valve such that the refrigerant is guided to the ice-making device through the first refrigerant pipe, and in response to a temperature of the ice-making tray falling to a level lower than or equal to a reference temperature, control switching of the switching valve to prevent the refrigerant from being guided to the first refrigerant pipe and control allowing of water to supply water to the ice-making tray.

The switching valve may be connected to the condenser through a refrigerant pipe, and the refrigerant pipe may be branched into the first refrigerant pipe connecting the switching valve to the ice-making device and the second refrigerant pipe connecting the switching valve to the evaporator.

The controller may be configured to: control the switching valve such that the temperature of the ice-making tray drops to a level lower than zero degrees before water is supplied to the ice-making tray, and in response to the temperature of the ice-making tray reaching zero degrees, block the first refrigerant pipe and control water to be supplied to the ice-making tray.

The controller may be configured to, in response to the temperature of the ice-making tray being detected as being higher than or equal to a predetermined temperature while the refrigerant is being guided to the evaporator, control the switching valve such that the refrigerant is guided to the ice-making device.

The controller may be configured to control the switching valve such that the first refrigerant pipe is blocked for a predetermined time after completion of supply of water.

The controller may be configured to control the switching valve such that the refrigerant is guided to the ice-making device in response to the predetermined time elapsing.

The controller may be configured to control the switching valve to open the first refrigerant pipe and block the second refrigerant pipe in response to the predetermined time elapsing.

The controller may be configured to control the switching valve to repeatedly open and close the first refrigerant pipe in response to the predetermined time elapsing.

The controller may be configured to set a time of opening the first refrigerant pipe and a time of closing the first refrigerant pipe as a first time and a second time, respectively, and control the switching valve such that the refrigerant is guided to the first refrigerant pipe during the first time and the refrigerant is guided to the second refrigerant pipe during the second time.

The controller may be configured to set the first time to be shorter than the second time.

The controller may be configured to control the compressor such that a revolution per minute of the compressor is reduced.

According to another aspect of the disclosure, there is provided a method of controlling a refrigerator provided with an ice-making device including an ice making tray, the method including: controlling a switching valve such that a refrigerant is guided to the ice-making device before water is supplied to the ice-making tray; in response to a temperature of the ice-making tray being lowered, controlling the switching valve to prevent the refrigerant from being guided to the ice-making device; and controlling water to be supplied to the ice-making tray.

The controlling of the switching valve may include: controlling the switching valve such that the temperature of the ice-making tray drops to a level lower than zero degrees before water is supplied to the ice-making tray; and in response to the temperature of the ice-making tray reaching zero degrees, blocking a first refrigerant pipe arranged inside the ice making device and controlling water to be supplied to the ice-making tray.

The controlling of the switching valve may include, in response to the temperature of the ice-making tray being detected as being higher than or equal to a predetermined temperature after completion of supply of water, controlling the switching valve such that the refrigerant is guided to the ice-making device.

The controlling of the switching valve may include controlling the switching valve such that the first refrigerant pipe is blocked for a predetermined time after completion of supply of water.

The controlling of the switching valve may include controlling the switching valve such that the refrigerant is guided to the ice-making device in response to the predetermined time elapsing.

The controlling of the switching valve may include controlling the switching valve to repeatedly open and close the first refrigerant pipe in response to the predetermined time elapsing.

The controlling of the switching valve may include: setting a time of opening the first refrigerant pipe and a time of closing the first refrigerant pipe as a first time and a second time, respectively; and setting the first time to be shorter than the second time.

The controlling of the switching valve may include controlling the compressor such that a revolution per minute of the compressor is reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
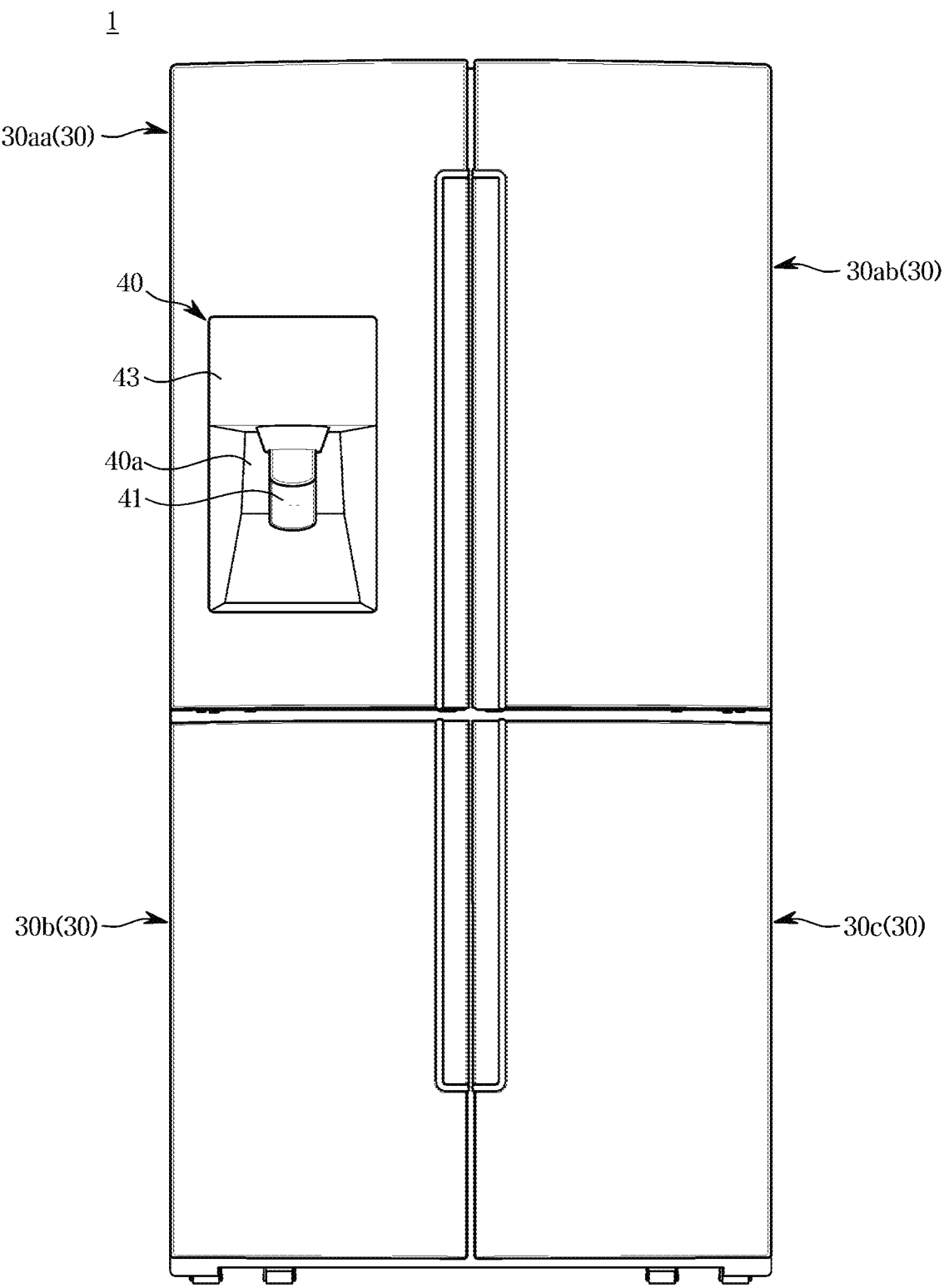
FIG. 1 illustrates the external appearance of a refrigerator according to an embodiment of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements.

Further, when it is stated that a layer is "on" another layer or substrate, the layer may be directly on another layer or substrate or a third layer may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described with reference to the accompanying drawings.

Figure 2:
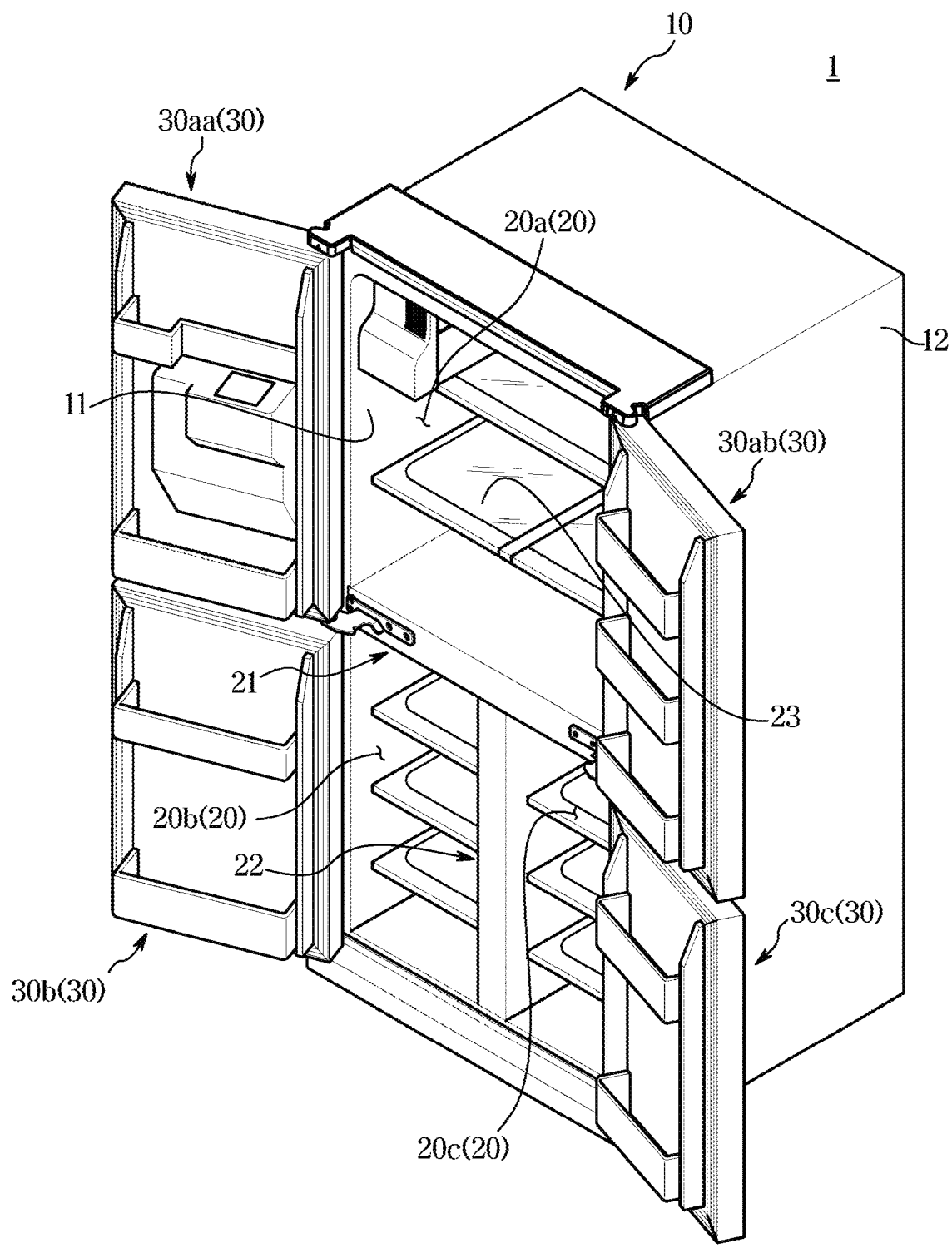
FIG. 2 illustrates is a front view of a refrigerator according to an embodiment of this disclosure.
Figure 3:
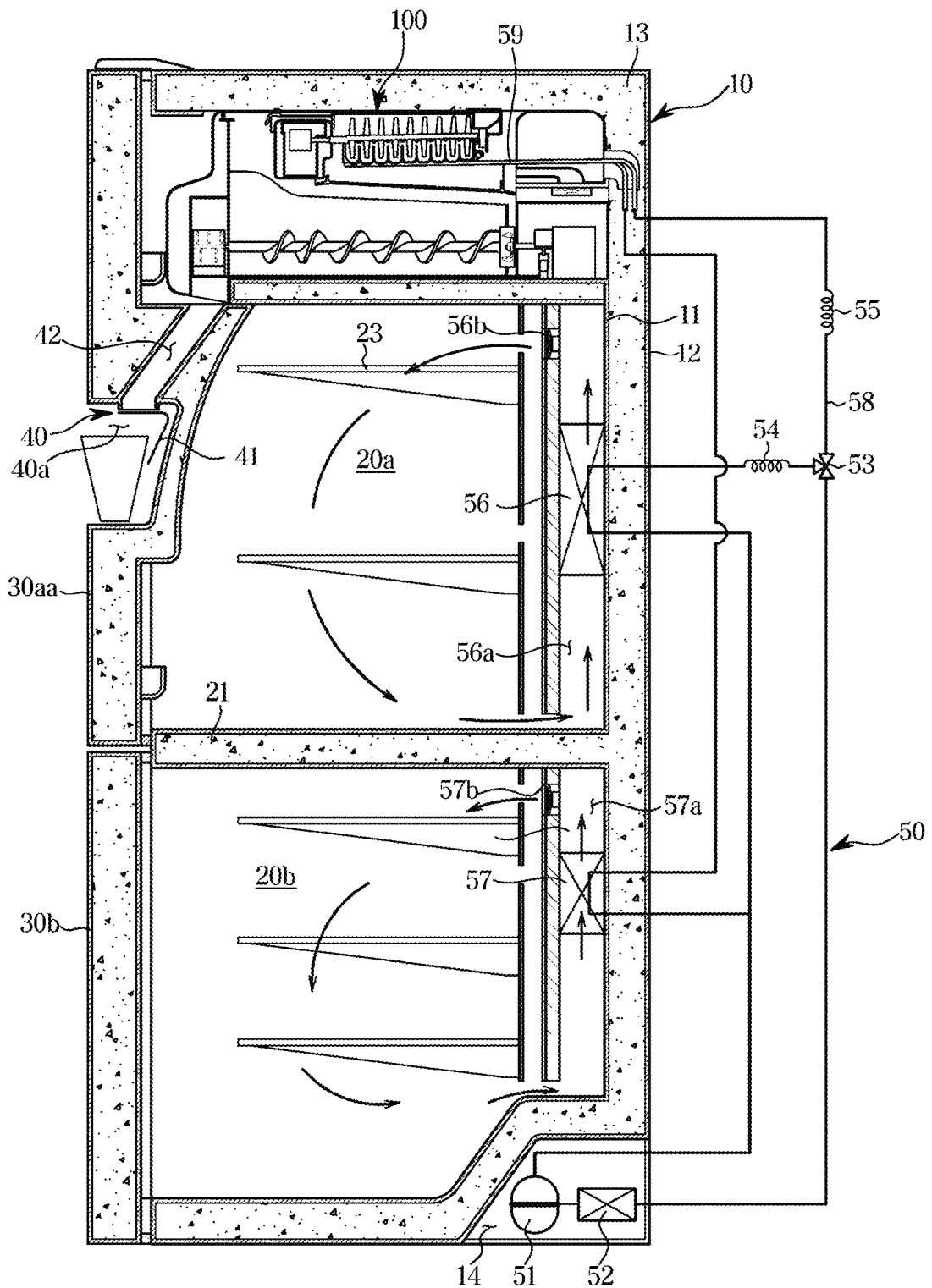
FIG. 3 illustrates is a cross-sectional view a refrigerator, which shows a cross section of a side surface of the refrigerator taken along a vertical direction according to an embodiment of this disclosure.

Referring to FIGS. 1, 2, and 3, a refrigerator 1 includes a main body 10 having an open front side and a storage chamber 20 formed inside the main body 10 and in which food is stored refrigerated and/or frozen, a door 30 to open and close the open front side of the main body 10, a cooling device 50 to cool the storage chamber 20, and an ice-making device 100 to produce ice.

The main body 10 forms the external appearance of the refrigerator 1. The main body 10 includes an inner case 11 forming the storage chamber 20 and an outer case 12 coupled to the outside of the inner case 11. An insulating material 13 capable of preventing the outflow of cold air from the storage chamber 20 is filled between the inner case 11 and the outer case 12 of the main body 10.

The storage chamber 20 may be divided into a plurality of spaces by a horizontal partition wall 21 and a vertical partition wall 22. For example, referring to FIG. 2, the storage chamber 20 may be divided into an upper storage chamber 20a, a first lower storage chamber 20b, and a second lower storage chamber 20c. In addition, the upper storage chamber 20a may store food in a refrigerated state, and the lower storage chambers 20b and 20c may store food in a frozen state.

The storage chamber 20 is provided with a shelf 23 on which food may be placed.

The storage chamber 20 may be opened and closed by the door 30. For example, referring to FIG. 2, the upper storage chamber 20a may be opened and closed by a first upper door 30aa and a second upper door 30ab. In addition, the first lower storage chamber 20b may be opened and closed by a first lower door 30b, and the second lower storage chamber 20c may be opened and closed by a second lower door 30c.

A handle 31 may be provided on the door 30 so as to easily open and close the door 30. The handle 31 may be formed to be elongated in the vertical direction between the first upper door 30aa and the second upper door 30ab and between the first lower door 30b and the second lower door 30c. Accordingly, when the door 30 is closed, the handle 31 may appear to be a unitary body.

A dispenser 40 may be provided at one side of the door 30. The dispenser 40 may discharge water or ice according to an input of a user. In other words, the user may directly take out water or ice without opening the door 30 through the dispenser 40.

The dispenser 40 includes a dispenser lever 41 to which a discharge command of a user is input, a dispenser chute 42 though which ice is discharged from the ice-making device 100, and a dispenser display panel 43 which displays an operation state of the dispenser 40.

The dispenser 40 may be installed at an outer side of the door 30 or the main body 10. For example, referring to FIG. 1, the dispenser 40 may be installed on the first upper door 30aa. However, the installation location of the dispenser 40 is not limited to the first upper door 30aa, and the dispenser 40 may be installed in various locations, including the second upper door 30ab, the first lower door 30b, the second lower door 30c, and the outer case 12 of the main body 10, as long as it can allow a user to take out water or ice.

The cooling device 50 includes a compressor 51 for compressing a refrigerant to a high pressure refrigerant, a condenser 52 for condensing the compressed refrigerant, expanders 54 and 55 for expanding the refrigerant to a low pressure refrigerant, evaporators 56 and 57 for evaporating the refrigerant, and a refrigerant pipe 58 for guiding the refrigerant.

The compressor 51 and the condenser 52 are provided in a machine chamber 14 provided at a lower portion of a rear side of the main body 10.

The evaporators 56 and 57 may include a first evaporator 56 for supplying cool air to the upper storage chamber 20a and a second evaporator 57 for supplying cool air to the lower storage chambers 20b and 20c. The first evaporator 56 is provided on a first cold air duct 56a provided at a rear side of the upper storage chamber 20a, and the second evaporator 57 is provided on a second cold air duct 57a provided at a rear side of the lower storage chambers 20b and 20c.

The first cold air duct 56a may be provided with a first blower fan 56b for supplying the cold air generated by the first evaporator 56 to the upper storage chamber 20a, and the second cold air duct 57a is provided with a second blower fan 57b for supplying the cold air generated by the second evaporator 57 to the lower storage chambers 20b and 20c.

The refrigerant pipe 58 may guide the refrigerant compressed by the compressor 51 to the first evaporator 56 or the second evaporator 57 and/or the ice-making device 100. The refrigerant pipe 58 is provided with a switching valve 53 for distributing the refrigerant to the first evaporator 56 or the second evaporator 57 and/or the ice-making device 100.

A part 59 (hereinafter referred to as "an ice-making refrigerant pipe") of the refrigerant pipe 58 may formed to extend into the ice-making device 100, and the ice-making refrigerant pipe 59 disposed inside the ice-making device 100 may be used to cool the water in the ice-making device 100 to make ice.

The ice-making device 100 may produce ice using the cold air of the ice-making refrigerant pipe 59, and may be provided at one side of the storage chamber 20. For example, referring to FIG. 2, the ice-making device 100 may be provided on an upper left side of the upper storage chamber 20a corresponding to the dispenser 40 installed in the first upper door 30aa. However, the location of the ice-making device 100 is not limited to that shown in FIG. 2, and the ice-making device 100 may be provided in the lower storage chambers 20b and 20c, or the horizontal partition wall between the upper storage chambers 20a and the lower storage chambers 20b and 20c.

Figure 4:
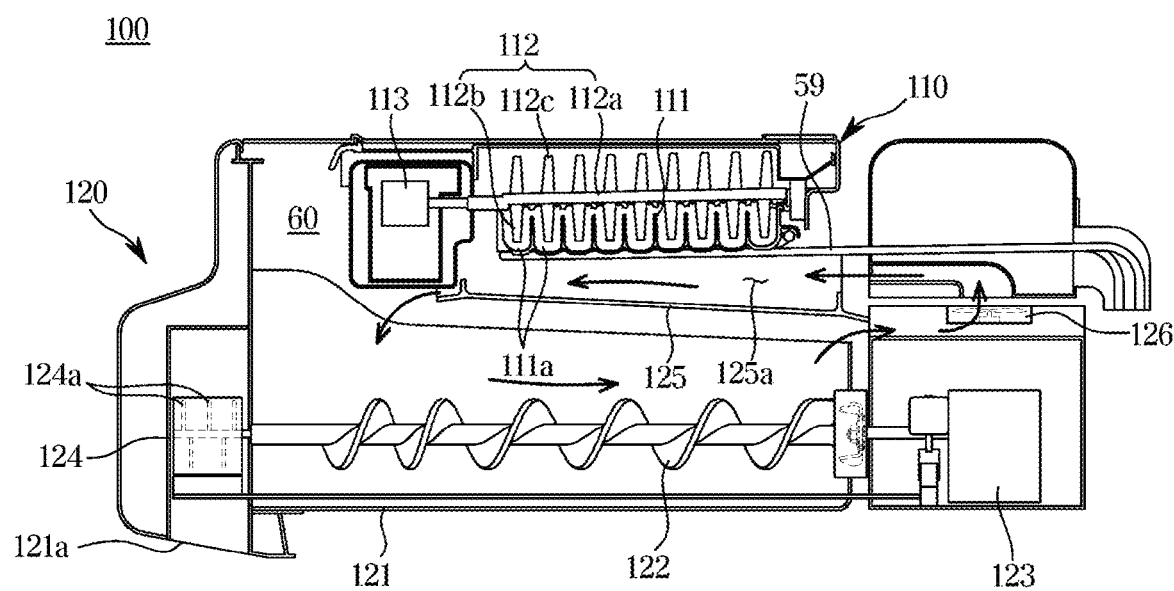
FIG. 4 illustrates a schematic view of a configuration of an ice-making apparatus included in a refrigerator according to an embodiment of this disclosure.

FIG. 4 illustrates a schematic view of an ice-making apparatus included in a refrigerator according to an embodiment of this disclosure.

Referring to FIG. 4, the ice-making device 100 may include an ice maker 110 for producing ice, and an ice storage 120 for storing ice produced by the ice maker 110.

The ice maker 110 includes an ice-making tray 111 that stores water for ice-making, a stirrer 112 that stirs the water stored in the ice-making tray 111 or separates ices in the ice-making tray 111, a stirring motor 113 for swinging or rotating the stirrer 112.

The ice-making tray 111 may include a plurality of ice-making cells 111a, and water for ice-making may be stored in each of the ice-making cells 111a. In addition, the ice-making refrigerant pipe 59 is provided at a lower side of the ice-making tray 111, and the ice-making tray 111 may be cooled to be lower than the freezing point of water (zero degrees Celsius) by the ice-making refrigerant pipe 59. Water stored in the ice-making cell 111a of the ice-making tray 111 is frozen and produced as ice.

The stirrer 112 is provided above the ice-making tray 111 to stir the water stored in the ice-making tray 111 while ice is being made, and separates the ice in the ice-making tray 111 after the ice is made.

The stirrer 112 includes a shaft 112a that is rotatably provided, a stirring blade 112b for stirring or shaking the water stored in the ice-making tray 111, and a scooping blade 112c formed to protrude from a sidewall of the shaft 112a and configured to separate the ice from the ice-making tray 111.

The stirring blade 112b may be formed to protrude from the sidewall of the shaft 112a, and may stir and shake the water in the ice-making tray 111 while the water in the ice-making tray 111 is being cooled. For example, the stirring blade 112b may swing or rotate in a clockwise or counterclockwise direction around the shaft 112a, and may stir the water in the ice-making tray 111 during swinging or rotating.

The scooping blade 112c may be formed to protrude from the sidewall of the shaft 112a, and after the water in the ice-making tray 111 is frozen, may separate the ice in the ice-making tray 111 from the ice-making tray 111. For example, the scooping blade 112c may rotate clockwise or counterclockwise around the shaft 112a, and may separate ice from the ice-making tray 111 duration rotation.

As such, the stirring blade 112b and the scooping blade 112c are formed to protrude from the sidewall of the shaft 112a, and rotate clockwise or counterclockwise around the shaft 112a.

The hardness of the stirring blade 112b and the hardness of the scooping blade 112c may be different from each other. For example, the scooping blade 112c for moving ice may be harder than the stirring blade 112b for stirring water in the ice-making tray 111.

The shape of the stirring blade 112b and the shape of the scooping blade 112c may be different from each other or the same as each other. For example, the stirring blade 112b and the scooping blade 112c may have a plate shape, or the scooping blade 112c may have a plate shape and the stirring blade 112b may have a spiral shape.

The stirring motor 113 allows the stirrer 112 to swing or rotate in a clockwise or counterclockwise direction. The stirring motor 113 may be connected to the shaft 112a of the stirrer 112, and the rotational force of the stirring motor 113 may be transmitted to the shaft 112a of the stirrer 112.

The stirring motor 113 may rotate at different speeds during ice-making and ice scooping. For example, during ice-making, the stirring motor 113 may rotate at approximately 60 revolution per minute (rpm) such that the stirring blade 112b stirs the water in the ice-making tray 111. In addition, after the ice is made, the stirring motor 113 may rotate at approximately 6 rpm such that the scooping blade 112c separates the ice from the ice-making tray 111.

The stirring motor 113 may swing or rotate clockwise or counterclockwise within a predetermined angle range. For example, the stirring motor 113 may alternately rotate clockwise and counterclockwise within a range of approximately 180 degrees so that the stirring blade 112b swings in the ice-making tray 111 during ice-making. In addition, the stirring motor 113 may rotate in a clockwise or counterclockwise direction within a range of approximately 360 degrees so that the scooping blade 112c rotates within the ice-making tray 111 after the ice is made.

The stirring motor 113 may be provided using a direct current (DC) motor that rotates in response to supply of DC power, an alternating current (AC) motor that rotates in response to supply of AC power, or a step motor that rotates in response to supply of a plurality of pulses.

The ice storage 120 includes an ice container 121 that stores ice made by the ice maker 110, a transporter 122 that transfers ice stored in the ice container 121 to a discharge port 121a, and a transfer motor 123 that drives the transporter 122, a crusher 124 that crushes ice discharged through the discharge port 121a, a cold air duct 125 that provides cold air from the ice-making refrigerant pipe 59 to the ice container 121, and an ice-storage fan 126 that circulates air in the ice storage 120.

The ice container 121 may be provided at a lower side of the ice-making tray 111 and store ice separated from the ice-making tray 111 by the stirrer 112. Ice may be separated from the ice-making tray 111 by the stirrer 112 and fall into the ice container 121. Ice fallen into the ice container 121 may be stored in the ice container 121 until an ice discharge command of a user is input.

The transporter 122 may transfer ice stored in the ice container 121 to the discharge port 121a of the ice container 121. For example, the transporter 122 may have a spiral shape as shown in FIG. 4, and the ice in the ice container 121 may be transferred to the discharge port 121a during rotation of the transporter 122 having a spiral shape.

The transfer motor 123 may rotate the transporter 122 having a spiral shape. For example, in response to the dispenser lever (41 in FIG. 1) being pressed, the transfer motor 123 may rotate, and according to the rotation of the transfer motor 123, the transporter 122 having a spiral shape may transfer ice in the ice container 121 to the discharge port 121a. In addition, the ice transferred to the discharge port 121a may be discharged through the dispenser chute 42 from the ice container 121.

The crusher 124 may crush the ice discharged through the discharge port 121a. For example, when ice is stored in the ice container 121 for a long time, the outer surfaces of the ices may melt due to friction between the ices. In addition, when the ice-making tray 111 is heated so that the ice is smoothly separated from the ice-making tray 111, the outer surfaces of the ices may melt. When the ice, of which the outer surface is melted, is cooled in the ice container 121, the ices may be stuck to each other.

The crusher 124 may separate the stuck ices from each other. The crusher 124 may include a plurality of crushing blades 124a. The plurality of crushing blade 124a may be rotated by the rotation of the transfer motor 123, and the plurality of crushing blade 124a, while rotating, may crush the ices stuck to each other to separate the stuck ices from each other.

The cold air duct 125 may be provided at a lower side of the ice-making tray 111, and may form a cold air passage 125*a* through which cold air flows so that the cold air of the ice-making refrigerant pipe 59 may be provided to the ice container 121.

Air in the cold air duct 125 may be cooled by the ice-making refrigerant pipe 59 and/or the ice-making tray 111. The air cooled by the ice-making refrigerant pipe 59 and/or the ice-making tray 111 may flow along the inside of the cold air duct 125, that is, along the cold air passage 125*a*. In particular, the cooled air may flow into the ice container 121 along the cold air passage 125*a*. The temperature of the ice container 121 may be maintained below zero degrees by the cooled air, and ice stored in the ice container 121 may be prevented from melting.

The ice-storage fan 126 may circulate the air of the cold air duct 125 and the air of the ice container 121. For example, the ice-storage fan 126 may suction air from the ice container 121 and discharge the suctioned air to the cold air duct 125 as shown in FIG. 4. As a result, the air may be cooled by the ice-making refrigerant pipe 59 and/or the ice-making tray 111 in the cold air duct 125, and the cooled air may flow to the ice container 121.

Figure 5:
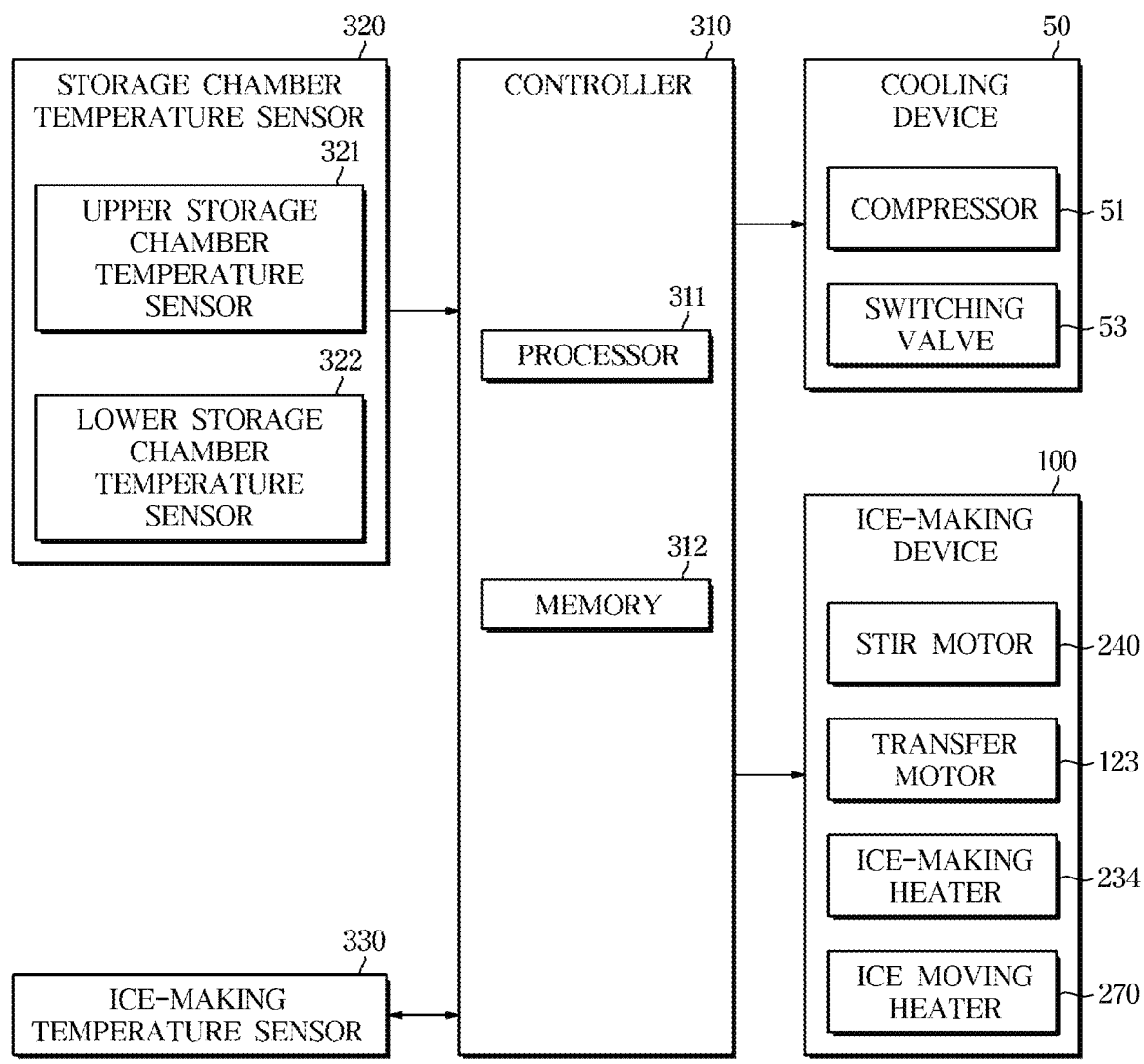
FIG. 5 illustrates a control block diagram of a refrigerator according to an embodiment of this disclosure.

FIG. 5 illustrates a control block diagram of a refrigerator according to an embodiment of this disclosure.

Referring to FIG. 5, the refrigerator 1 includes a storage chamber temperature sensor 320 that measures the temperature of the storage chamber 20, an ice-making temperature sensor 330 that measures the temperature of the ice-making device 100, the cooling device 50 that cools the storage chamber 20, the ice-making device 100 that makes ice, and the controller 310 that controls the cooling device 50 according to an output of the storage chamber temperature sensor 320 and controls the ice-making device 100 according to an output of the ice-making temperature sensor 330.

The storage chamber temperature sensor 320 may include an upper storage chamber temperature sensor 321 that measures the temperature of the upper storage chamber (20*a* in FIG. 3), and a lower storage chamber temperature sensor 322 that measures the temperature of the lower storage chamber (20*b* in FIG. 3).

The upper storage chamber temperature sensor 321 may be provided in the upper storage chamber (20*a* in FIG. 3), and configured to measure the temperature of the upper storage chamber (20*a* in FIG. 3) and output an electrical signal corresponding to the temperature of the upper storage chamber (20*a* in FIG. 3) to the controller 310. For example, the upper storage chamber temperature sensor 321 may include a thermistor of which an electrical resistance value changes according to the temperature.

The lower storage chamber temperature sensor 322 may be provided in the lower storage chamber (20*b* in FIG. 3), and configured to measure the temperature of the lower storage chamber (20*b* in FIG. 3) and output an electrical signal corresponding to the temperature of the lower storage chamber (20*b* in FIG. 3) to the controller 310. For example, the lower storage chamber temperature sensor 322 may include a thermistor of which an electrical resistance value changes according to the temperature.

The ice-making temperature sensor 330 may be provided in the ice-making device 100. For example, the ice-making temperature sensor 330 may be installed in the ice-making tray 111 in which water for making ice is stored.

The ice-making temperature sensor 330 may measure the temperature of water or ice accommodated in the ice-making tray 111 and output an electrical signal corresponding to the temperature of the water or ice to the controller 310. For example, the ice-making temperature sensor 330 may include a thermistor of which an electrical resistance value changes according to the temperature.

The cooling device 50 may include the compressor 51, the condenser (52 in FIG. 3), the expanders (54 and 55 in FIG. 3), the evaporator (56 and 57 in FIG. 3), the refrigerant pipe (58 in FIG. 3), and the switching valve 53 as shown in FIG. 3.

The compressor 51 may compress the refrigerant to a high pressure refrigerant in response to a control signal from the controller 310 and discharge the high pressure refrigerant to the condenser (52 in FIG. 3). In addition, the switching valve 53 may supply a refrigerant to at least one of the evaporator (56 in FIG. 3) of the upper storage chamber (20*a* in FIG. 3) and the evaporator (57 in FIG. 3) of the lower storage chamber (20*b* in FIG. 3) in response to a control signal from the controller 310. In other words, in response to a control signal from the controller 310, the compressor 51 may generate a flow of refrigerant, and the switching valve 53 may control a flow path of the refrigerant.

The ice-making device 100 may include ice-making trays 210 and 220, a stirrer 230, a stirring motor 240, an ice container (121 in FIG. 3), a transporter (122 in FIG. 3), a transfer motor (123 in FIG. 3), an ice-making heater 234, and an ice moving heater 270.

In response to a control signal from the controller 310, the stirring motor 240 may drive the stirrer 230 for stirring or shaking water. In response to a control signal from the controller 310, the transfer motor 123 may drive the transporter 122 for discharging ice from the ice storage 120.

The ice-making device 100 includes the ice-making heater 234 that maintains the temperature inside the ice maker 110 at a temperature above zero degrees, and the ice moving heater 270 that heats the ice maker 110 to separate ice from the ice maker 110.

The controller 310 includes a memory 312 storing programs and data for controlling the operation of the refrigerator 1, and a processor 311 generating a control signal for controlling the operation of the refrigerator 1 according to the program and data stored in the memory 312. The processor 311 and the memory 312 may be implemented as separate chips, or may be implemented as a single chip.

The memory 312 may store control programs and control data for controlling the operation of the refrigerator 1 and various application programs and various pieces of application data that perform various functions according to a user input. In addition, the memory 312 may temporarily store outputs of the storage chamber temperature sensor 320 and the ice-making temperature sensor 330.

The memory 312 may include a volatile memory, such as a static random access memory (S-RAM), a dynamic random access memory (D-RAM), for temporarily storing data. In addition, the memory 312 may include a nonvolatile memory, such as a Read Only Memory (ROM), an Erasable Programmable Read Only Memory (EPROM), and an Electrically Erasable Programmable Read Only Memory (EEPROM), for storing data for a long period of time.

The processor 311 may include various logic circuits and arithmetic circuits, may process data according to a program provided from the memory 312 and generate a control signal according to the processing result.

For example, the processor 311 may process the output of the storage chamber temperature sensor 320 and generate a control signal for controlling the compressor 51 and the switching valve 53 of the cooling device 50. In addition, the processor 311 may process the output of the ice-making temperature sensor 330 and generate a control signal for controlling the stirring motor 240, the transfer motor 123, the ice-making heater 234, and the ice moving heater 270 of the ice-making device 100.

As such, the controller 310 may control each component included in the refrigerator 1 according to the temperature of the storage chamber 20 and the temperature of the ice-making device 100.

In addition, it should be understood that the operation of the refrigerator 1 described below is controlled by the controller 310.

On the other hand, the disclosure is provided to remove a difficulty in independently controlling the cooling rate of the ice-making device 100 when the refrigerant pipe extending into the ice-making device 100 is arranged in series with the evaporators 56 and 57 by allowing a refrigerant to bypass the ice-making device 100. Hereinafter, the arrangement of the refrigerant pipe 58 for allowing a refrigerant to bypass the ice-making device and the flow of the refrigerant will be described in detail.

Figure 6:
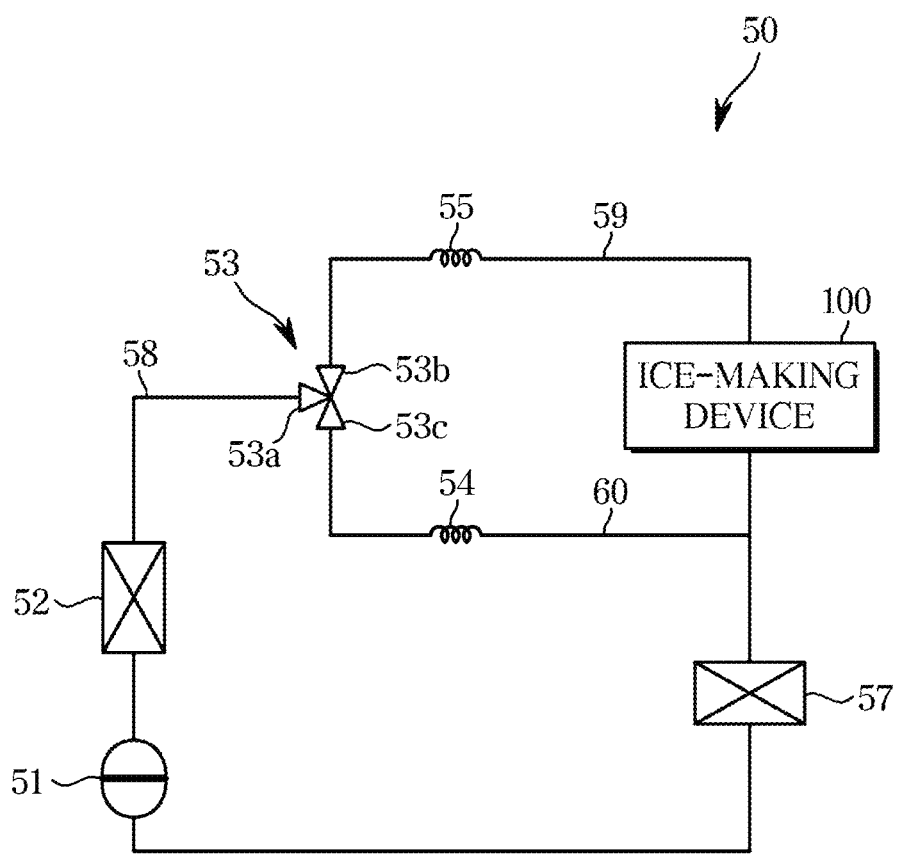
FIG. 6 illustrates a view of a connection of a refrigerant pipe of a refrigerator according to an embodiment of this disclosure.
Figure 7:
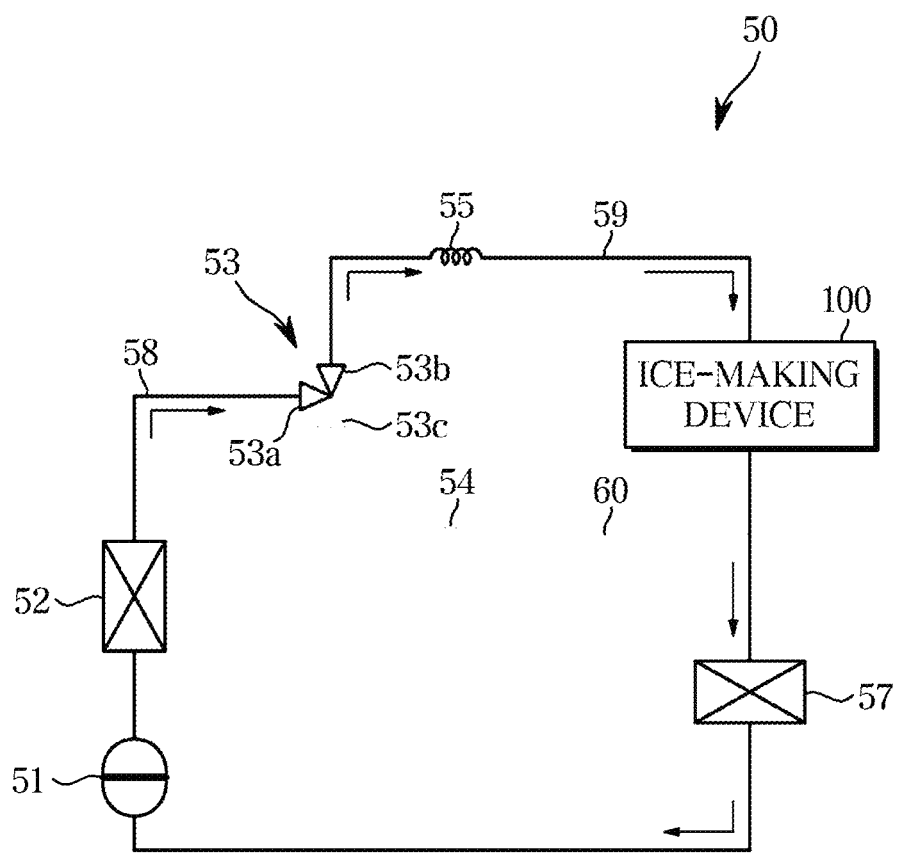
FIGS. 7 and 8 illustrate views of a flow of a refrigerant by control of a switching valve according to an embodiment of this disclosure.
Figure 8:
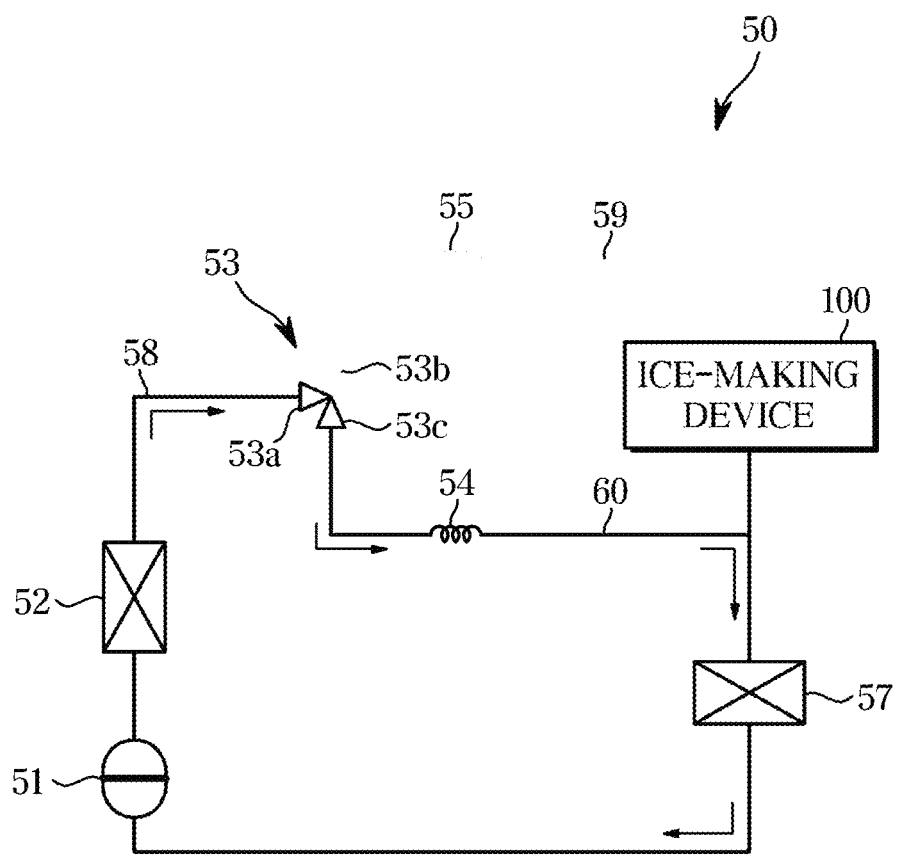

FIG. 6 illustrates a view of a connection of the refrigerant pipe 58 of the refrigerator according to an embodiment of this disclosure, and FIGS. 7 and 8 illustrate views of a flow of refrigerant by control of the switching valve 53 according to an embodiment of this disclosure.

The cooling device according to the embodiment includes the compressor 51, the condenser 52, the expanders 54 and 55, the evaporator 57, the refrigerant pipe 58, and the switching valve 53 as described in FIG. 3. However, in FIGS. 6 to 8, for the sake of convenience of description, the following description will be made in relation to the evaporator 57 of the lower storage chamber (20b in FIG. 3), but the evaporator 57 shown in FIGS. 6 to 8 may represent the evaporator (56 in FIG. 3) of the upper storage chamber (20a in FIG. 3), and the upper storage chamber 20a and the lower storage chamber 20b may be cooled at the same time.

The switching valve 53 may guide the refrigerant discharged from the condenser 52 to at least one of a first refrigerant pipe 59 and a second refrigerant pipe 60 in response to a signal from a controller (not shown). In particular, the refrigerant pipe 58 may be branched into the first refrigerant pipe 59 and the second refrigerant pipe 60 by the switching valve 53, and the refrigerant introduced into the first refrigerant pipe 59 may be delivered to the ice-making device 100, and the refrigerant introduced into the second refrigerant pipe 60 may be delivered only to the evaporator 57 by bypassing the ice-making device 100.

The switching valve 53 may employ a three-way valve, and include an inlet 53a through which a refrigerant is introduced from the condenser 52, a first outlet 53b through which a refrigerant flows out to the ice-making device 100, and a second outlet 53c through which a refrigerant flows out to the evaporator 57.

During the water cooling process, the controller 310 may control the switching valve 53 so that the first outlet 53b is opened and the second outlet 53c is blocked so that the refrigerant flows out to the first refrigerant pipe 59. Referring to FIG. 7, the refrigerant may be sequentially supplied to the ice-making device 100 and the evaporator 57 to thereby lower the temperature of the ice-making tray 111 of the ice-making device 100. For the sake of convenience of description, the flow of the refrigerant in FIG. 7 is defined as a first mode.

In the first mode, the ice-making device 100, in a case in which water is stored in the ice-making tray 111, may cool the water. In addition, in the first mode, the ice-making device 100, in a case in which water is not stored in the ice-making tray 111, may lower the temperature of the ice-making tray 111 before cooling water.

In addition, the controller 310 may control the switching valve 53 so that the first outlet 53b is blocked and the second outlet 53c is opened so that the refrigerant flows out to the second refrigerant pipe 60. Referring to FIG. 8, the refrigerant may be supplied to the evaporator 57 without passing through the ice-making device 100. For the sake of convenience of description, the flow of the refrigerant in FIG. 8 is defined as a second mode.

In the second mode, since the refrigerant is delivered only to the evaporator 57 by bypassing the ice-making device 100, unlike the first mode, the temperature of the ice-making device 100 is not lowered. When water is supplied after the temperature of the ice-making tray 111 reaches a level below zero degrees in the first mode, and then the operation enters the second mode, the water stored in the ice-making tray 111 is subject to phase-change into ice due to the remaining cold air. In addition, the supply of water may be performed after entry into the second mode, or the supply of water and the entry into the second mode may be performed simultaneously. In this case, a time period during which a phase change proceeds in the second mode may be longer than a time period during which a phase change proceeds in the first mode. Accordingly, in the second mode, a time for discharging dissolved gas is sufficiently secured compared to the first mode, so that transparent ice may be generated.

Meanwhile, in the above, the connection structure of the cooling device and operation modes based on control of the switching valve 53 according to the embodiment have been described. Hereinafter, control processes based on the above-described connection structure of the cooling device will be described in detail.

Figure 9:
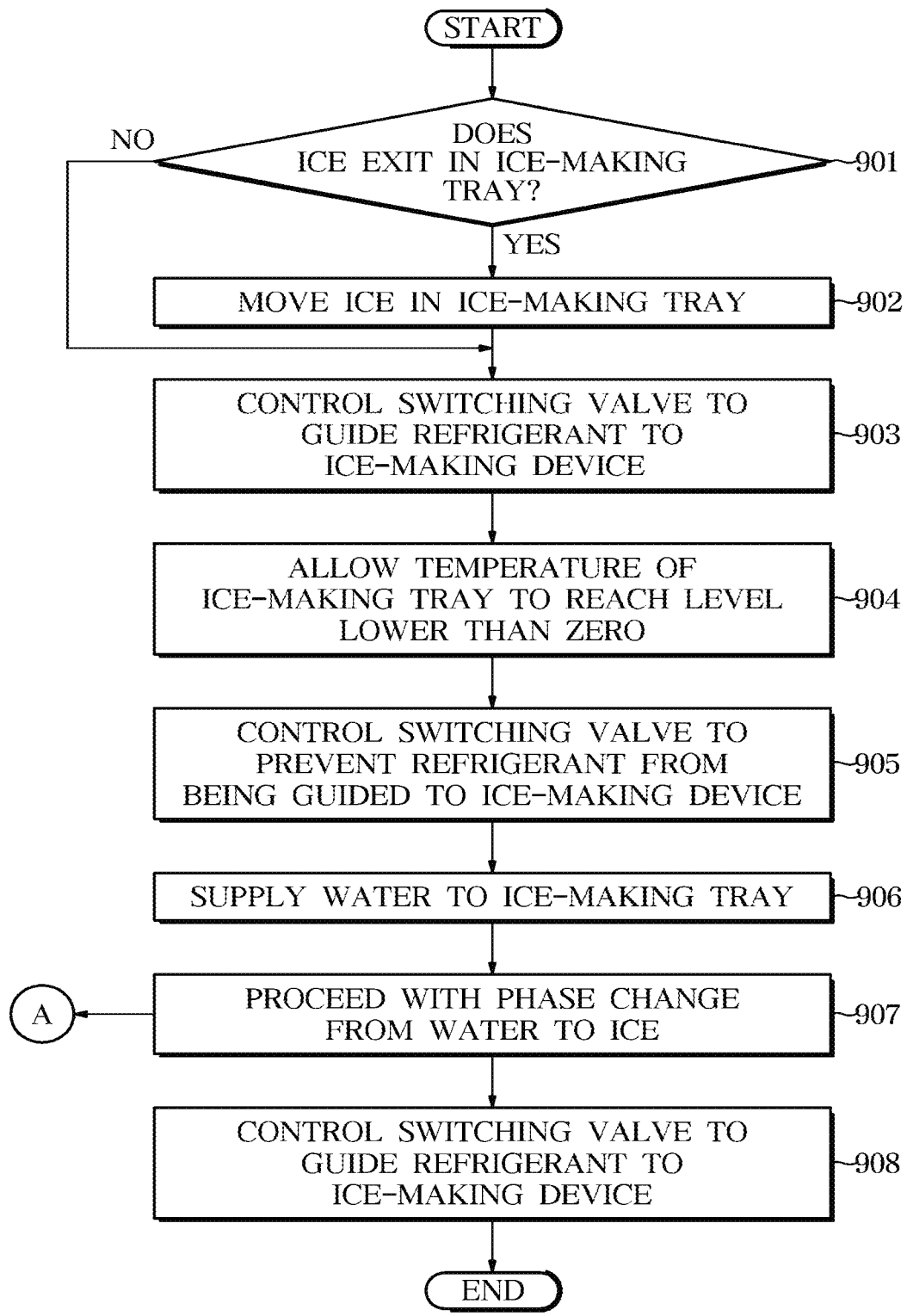
FIG. 9 illustrates a flowchart showing a method of controlling a refrigerator according to an embodiment of this disclosure.
Figure 10:
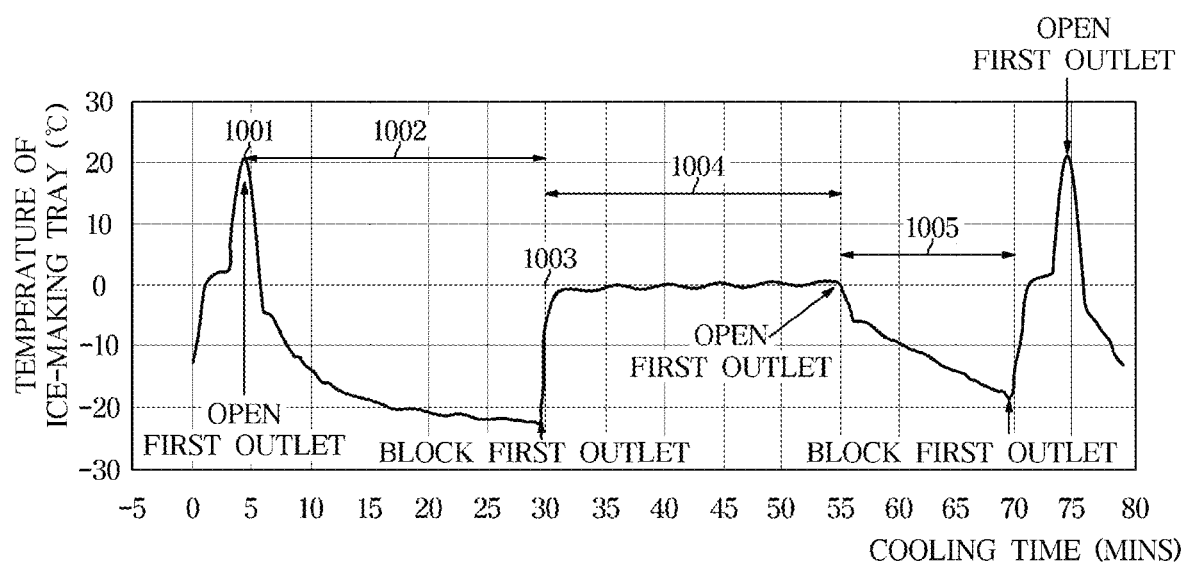
FIG. 10 illustrates an example of an ice-making operation, which is referred to FIG. 9 according to an embodiment of this disclosure.

FIG. 9 illustrates a flowchart showing a method of controlling a refrigerator according to an embodiment of this disclosure, and FIG. 10 illustrates a view illustrating an example of an ice-making operation, which is referred to FIG. 9 according to an embodiment of this disclosure.

The controller 310 determines whether ice exits in the ice-making tray 111 (901), and when ice exists in the ice-making tray 111, moves the ice (902). When the production of ice is completed, the controller 310 of the refrigerator may store the produced ice in the ice storage and separate the ice from the ice maker 110 in order to make new ice. Specifically, the controller 310 may operate the ice-moving heater to separate ice from the ice-making tray 111, and output a signal to the stirring motor so that an ice-scooping member 233 of the stirrer 112 pushes the ice out of the ice-making tray 111.

The controller 310 controls the switching valve 53 to guide the refrigerant to the ice-making device 100 (903). Specifically, the controller 310 controls the switching valve 53 so that the first outlet 53b is opened and the second outlet 53c is blocked. For example, the controller 310 performs control to cause the temperature of the ice-making tray 111 to reach a first reference temperature, in which the first reference temperature may be −10 to −20 degrees Celsius at which water may be frozen. Referring to FIG. 10 in conjunction with FIG. 9, the controller 310 controls to heat the ice-making tray 111 to separate ice from the ice-making tray 111, controls to open the first outlet 53b of the switching valve 53 for the temperature of the ice-making tray 111 to reach the first reference temperature (1001), and allows the temperature of the ice-making tray 111 to reach the first reference temperature before water is supplied to the ice-making tray 111 (1002).

When the temperature of the ice-making tray 111 reaches the first reference temperature, the controller 310 controls the switching valve 53 so that the refrigerant is not guided to the ice-making device 100 (905). Specifically, the controller 310 controls the switching valve 53 so that the first outlet 53b is blocked and the second outlet 53c is opened. The controller 310 controls to supply water to the ice-making tray 111 (906). In this case, the water stored in the ice-making tray 111 may be subject to phase-change only by the heat capacity of the ice-making tray 111 itself and the temperature of the ice-making device 100 and frozen into ice (907). Therefore, unlike the case where the refrigerant is supplied to the ice-making device 100, the time for phase change is sufficiently secured, so that the time of discharging dissolved gas is lengthened, and more transparent ice may be generated compared to the conventional technology. Referring again to FIG. 10, the controller 310 controls to block the first outlet 53b of the switching valve 53 such that the temperature of the ice-making tray 111 is not lowered any more, and controls to supply water to the ice-making tray 111 (1003). When water is supplied to the ice-making tray 111, a phase change from water to ice proceeds only with the heat capacity of the ice-making device 100 (1004).

When the phase change is completed, the controller 310 controls the switching valve 53 to guide the refrigerant to the ice-making device 100 (908). The ice-making device 100 allows ice to have a temperature lower than zero degrees so that the ice does not melt even when the ambient temperature changes. Referring again to FIG. 10, the controller 310 controls to open the first outlet 53b of the switching valve 53 such that the temperature of ice contained in the ice-making tray 111 is lowered to a level lower than zero degrees (1005).

Here, the timing at which the first outlet 53b of the switching valve 53 is opened may be set based on various criteria.

According to the embodiment, the controller 310, in response to detecting that the temperature of the ice-making tray 111 is zero degrees or higher, may control the control valve so that the refrigerant is guided to the ice-making device 100. Referring to FIG. 10, while water is being phase-changed into ice, the temperature of water or ice may be kept constant at the freezing point of water (zero degrees). When the temperature of water or ice falls to a level below the freezing point of water (zero degrees), it may be determined whether the water is frozen, and the ice-making device 100 may perform additional cooling such that the ice does not melt even with changes in ambient temperature. In other words, the controller 310 performs first cooling in which ice-making is performed using the heat capacity of the ice-making tray 111 itself (1004), and when the first cooling is completed, performs secondary cooling to further lower the temperature of the ice that is completed with ice-making (1005). The controller 310, in response to detecting that the temperature of the ice-making tray 111 is higher than or equal to a preset temperature, may control the switching valve 53 to guide the refrigerant to the ice-making device 100. In this case, the first outlet 53b of the switching valve 53 is opened. However, the preset temperature may be set to a temperature that is approximately 1 to 2 degrees Celsius lower than the freezing point of water such that water is sufficiently frozen, rather than zero degrees Celsius.

In addition, according to the embodiment, the controller 310 may control the switching valve 53 so that the first refrigerant pipe 59 is blocked for a predetermined time after the supply of water is completed. In this case, the first outlet 53b of the switching valve 53 is blocked. Referring to FIG. 10, the predetermined time indicates the time section of operation 1004. In this case, the predetermined time may be adjusted in consideration of the heat capacity of water stored in the ice-making tray 111, and is not limited to the time shown in FIG. 10. Here, the controller 310 performs first cooling in which ice-making is performed using the heat capacity of the ice-making tray 111 itself for the predetermined time, and when the predetermined time elapses, controls the switching valve 53 to perform secondary cooling to further lower the temperature of the ice that is completed with ice-making. Specifically, the controller 310 controls the switching valve 53 so that the refrigerant is guided to the ice-making device 100. In this case, when the predetermined time elapses, the controller 310 allows the first outlet 53b to be opened to open the first refrigerant pipe 59, and allows the second outlet 53c to be blocked to block the second refrigerant pipe 60.

On the other hand, after operation 907 of FIG. 9, in order to further improve the transparency of the ice, the ice having the phase change completed may be subject to secondary cooling of repeatedly opening and blocking of the first outlet 53b, different from operation 908. Details thereof will be described with reference to FIGS. 11 and 12.

Figure 11:
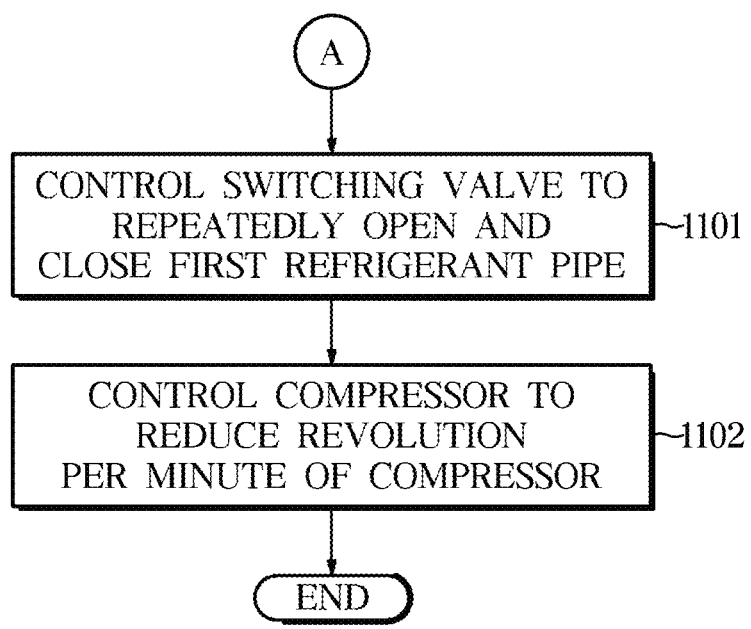
FIG. 11 illustrates a flowchart showing a method of controlling a refrigerator according to another embodiment of this disclosure.
Figure 12:
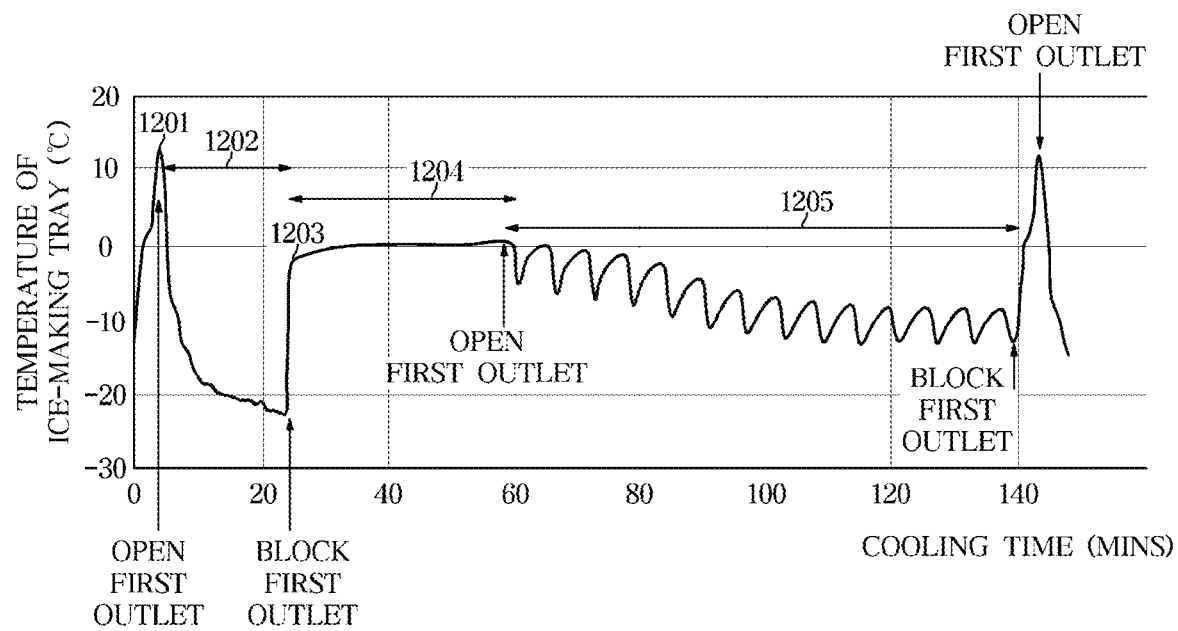
FIG. 12 illustrates a view of an example of an ice-making operation referenced to FIG. 11 according to an embodiment of this disclosure.

FIG. 11 illustrates a flowchart showing a method of controlling a refrigerator according to another embodiment of this disclosure. FIG. 12 illustrates a view of an example of an ice-making operation referenced to FIG. 11 according to an embodiment of this disclosure. Control processes (until the phase change from water to ice) prior to operation 1101 in FIG. 11 are referred to FIG. 9.

The controller 310 controls the switching valve 53 so that the first refrigerant pipe 59 is repeatedly opened and closed. The controller 310 may control the switching valve 53 so that the refrigerant introduced from the condenser 52 flows into the first refrigerant pipe 59 during a first time and flows into the second refrigerant pipe 60 during a second time. During the first time, the first outlet 53b of the switching valve 53 is opened and the second outlet 53c of the switching valve 53 is blocked, and during the second time, the first outlet 53b of the switching valve 53 is blocked and the second outlet 53c of the switching valve 53 is opened.

Referring to FIG. 12, the controller 310 repeatedly opens and blocks the first outlet 53b according to a predetermined period, so that the temperature of the ice-making tray 111 rises and falls repeatedly according to the predetermined period (1205). In this case, the rate of decrease of the temperature of the ice-making tray 111 is slower than that of operation 1005 of FIG. 10, and a time for discharging dissolved gas may be additionally secured.

In addition, the controller 310 may adjust a ratio of the first time and the second time to further slow the rate of decrease of the temperature of the ice-making tray 111. Specifically, the controller 310 may control to decrease the first time, which is the opening time of the first outlet 53b, and increase the second time, which is the blocking time of the first outlet 53b. According to the embodiment, the first time may be shorter than the second time, and the ratio of the first time and the second time may set to various ratios and may be adjusted according to the speed of the compressor 51.

In addition, as a method of slowing down the rate of decrease of the temperature of the ice-making tray 111, the controller 310 may reduce the output of the compressor 51. The controller 310 may decrease the speed of the compressor 51 in operation 1005 of FIG. 10 or operation 1205 of FIG. 12 (1102).

According to an embodiment, when the first cooling is performed and the phase change from water to ice is completed, the first outlet 53*b* may be maintained in an open state, and the speed of the compressor 51 may be reduced to secure the cooling time of the ice-making device.

In addition, according to an embodiment, when the first cooling is performed and the phase change from water to ice is completed, the first outlet 53*b* may be repeatedly opened and blocked at the same time as the speed of the compressor 51 may be reduced to thereby additionally secure the cooling time of the ice-making device.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, ice having a high transparency and density can be produced by controlling the cooling rate of the ice-making device.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
   a compressor configured to compress a refrigerant;
   a condenser configured to condense the compressed refrigerant;
   an evaporator configured to evaporate the condensed refrigerant;
   a first refrigerant pipe and a second refrigerant pipe connected between the condenser and the evaporator;
   a switching valve configured to guide the refrigerant condensed in the condenser to the first refrigerant pipe or the second refrigerant pipe;
   an ice-maker configured to be directly cooled by the first refrigerant pipe and cool water stored in an ice-making tray, wherein the ice-making tray is configured to receive cooling energy from the first refrigerant pipe via conduction; and
   a controller configured to:
      control the switching valve to guide the refrigerant to the ice-maker through the first refrigerant pipe before water is supplied to the ice-making tray,
      in response to a temperature of the ice-making tray falling to a level lower than or equal to a reference temperature, control the switching valve to prevent the refrigerant from being guided to the first refrigerant pipe and, after preventing flow of the refrigerant, supply the water to the ice-making tray,
      control the switching valve to block the first refrigerant pipe for a predetermined time after the water is supplied,
      in response to the predetermined time elapsing, control the switching valve to repeatedly open and close the first refrigerant pipe, and control the switching valve to open the first refrigerant pipe during a first time and close the first refrigerant pipe during a second time, such that the temperature of the ice-making tray repeatedly rises and falls, causing dissolved gas in the water in the ice-making tray to discharge, and
      wherein the first time is shorter than the second time.

2. The refrigerator of claim 1, wherein the switching valve is connected to the condenser through a refrigerant pipe, and the refrigerant pipe is branched into the first refrigerant pipe connecting the switching valve to the ice-maker and the second refrigerant pipe connecting the switching valve to the evaporator.

3. The refrigerator of claim 2, wherein the controller is further configured to:
   control the switching valve to reduce the temperature of the ice-making tray to a level lower than zero degrees before the water is supplied to the ice-making tray; and
   in response to the temperature of the ice-making tray reaching zero degrees, block the first refrigerant pipe and supply the water to the ice-making tray.

4. The refrigerator of claim 1, wherein in response to the predetermined time elapsing the controller is configured to control the switching valve to guide the refrigerant to the ice-maker.

5. The refrigerator of claim 1, wherein in response to the predetermined time elapsing, the controller is configured to control the switching valve to open the first refrigerant pipe and block the second refrigerant pipe.

6. The refrigerator of claim 1, wherein the controller is further configured to:
   set a time of opening the first refrigerant pipe as the first time;
   set a time of closing the first refrigerant pipe as the second time; and
   control the switching valve to guide the refrigerant to the first refrigerant pipe during the first time and the refrigerant is guided to the second refrigerant pipe during the second time.

7. The refrigerator of claim 6, wherein the controller is further configured to set the first time to be shorter than the second time.

8. The refrigerator of claim 6, wherein the controller is further configured to reduce a revolution per minute of the compressor.

9. A method of controlling a refrigerator provided with an ice-maker including an ice-making tray, the method comprising:
   controlling a switching valve to guide a refrigerant to the ice-maker before water is supplied to the ice-making tray;
   in response to a temperature of the ice-making tray being lowered, controlling the switching valve to prevent the refrigerant from being guided to the ice-maker; and
   after preventing flow of the refrigerant, supplying the water to the ice-making tray,
   wherein the ice-making tray is configured to receive cooling energy from the refrigerant via conduction,
   wherein the controlling of the switching valve further includes:
   controlling the switching valve to block a first refrigerant pipe arranged inside the ice making tray for a predetermined time after the water is supplied,
   in response to the predetermined time elapsing, controlling the switching valve to repeatedly open and close the first refrigerant pipe, and controlling the switching valve to open the first refrigerant pipe during a first time and close the first refrigerant pipe during a second time, such that the temperature of the ice-making tray repeatedly rises and falls, causing dissolved gas in the water in the ice-making tray to discharge, and
   wherein the first time is shorter than the second time.

10. The method of claim 9, wherein the controlling of the switching valve includes:
- controlling the switching valve to reduce the temperature of the ice-making tray to a level lower than zero degrees before the water is supplied to the ice-making tray; and
- in response to the temperature of the ice-making tray reaching zero degrees, blocking the first refrigerant pipe and supplying the water to the ice-making tray.

11. The method of claim 9, wherein in response to the predetermined time elapsing, controlling of the switching valve comprises controlling the switching valve to guide the refrigerant to the ice-maker.

12. The method of claim 9, wherein the controlling of the switching valve comprises:
- setting a time of opening the first refrigerant pipe as the first time;
- setting a time of closing the first refrigerant pipe as the second time; and
- setting the first time to be shorter than the second time.

13. The method of claim 9, further comprising:
- reducing a revolution per minute of a compressor.

14. The method of claim 9, wherein in response to the predetermined time elapsing, controlling the switching valve comprises controlling the switching valve to open the first refrigerant pipe and block a second refrigerant pipe.

* * * * *